United States Patent
Latzina et al.

(10) Patent No.: US 10,908,793 B2
(45) Date of Patent: *Feb. 2, 2021

(54) PERSISTENT APPLICATION INTERFACE MANAGEMENT

(71) Applicant: SAP SE, Walldorf (DE)

(72) Inventors: Markus Latzina, Wiesenbach (DE); Knut Manske, Oftersheim (DE)

(73) Assignee: SAP SE, Walldorf (DE)

(*) Notice: Subject to any disclaimer, the term of this patent is extended or adjusted under 35 U.S.C. 154(b) by 94 days.

This patent is subject to a terminal disclaimer.

(21) Appl. No.: 16/242,643

(22) Filed: Jan. 8, 2019

(65) Prior Publication Data

US 2019/0138191 A1 May 9, 2019

Related U.S. Application Data

(63) Continuation of application No. 14/926,838, filed on Oct. 29, 2015, now Pat. No. 10,209,869.

(51) Int. Cl.
| | |
|---|---|
| *G06F 3/0484* | (2013.01) |
| *G06F 17/24* | (2006.01) |
| *G06F 3/0481* | (2013.01) |
| *G06F 40/169* | (2020.01) |

(52) U.S. Cl.
CPC ........ *G06F 3/04842* (2013.01); *G06F 3/0481* (2013.01); *G06F 40/169* (2020.01)

(58) Field of Classification Search
CPC .... G06F 17/5081; G06F 3/048; G06F 3/0481; G06F 17/248
See application file for complete search history.

(56) References Cited

U.S. PATENT DOCUMENTS

| | | |
|---|---|---|
| 7,870,499 B2 | 1/2011 | Latzina et al. |
| 7,877,691 B2 | 1/2011 | Goering et al. |
| 7,987,176 B2 | 7/2011 | Latzina et al. |
| 8,161,087 B2 | 4/2012 | Latzina |
| 8,229,944 B2 | 7/2012 | Latzina et al. |
| 8,594,997 B2 | 11/2013 | Soltani et al. |
| 8,595,227 B2 | 11/2013 | Beringer et al. |
| 8,700,389 B2 | 4/2014 | Latzina et al. |
| 9,009,617 B2 | 4/2015 | Latzina |
| 9,031,920 B2 | 5/2015 | Soltani et al. |
| 9,053,293 B2 | 6/2015 | Latzina |
| 9,058,188 B2 | 6/2015 | Latzina et al. |
| 9,330,176 B2 | 5/2016 | Latzina et al. |

(Continued)

*Primary Examiner* — Sang H Kim
(74) *Attorney, Agent, or Firm* — Fish & Richardson P.C.

(57) ABSTRACT

The present disclosure involves systems, software, and computer implemented methods for managing and persisting application interfaces and windows into reusable arrangements. In one example, a method may include identifying a work area of a first user, the work area including a presentation of a plurality of windows, each window associated with an application and receiving a selection of at least one of the plurality of windows in the work area. In response to receiving a request to associate the selected windows with a workplace schema, locations of the selected windows in the work area are determined. The determined locations of the selected windows are stored in a first workplace schema, where the first workplace schema stores the layout of the work area based on the determined locations of the selected windows.

19 Claims, 9 Drawing Sheets

(56) References Cited

U.S. PATENT DOCUMENTS

| | | |
|---|---|---|
| 9,449,062 B2 | 9/2016 | Latzina |
| 9,921,714 B1* | 3/2018 | Shapiro ............... G06F 3/04817 |
| 2003/0184592 A1* | 10/2003 | Awada ................. G06F 3/0481 |
| | | 715/788 |
| 2008/0256454 A1 | 10/2008 | Latzina et al. |
| 2008/0288877 A1 | 11/2008 | Latzina et al. |
| 2010/0169310 A1 | 7/2010 | Latzina |
| 2011/0087982 A1 | 4/2011 | McCann |
| 2012/0096395 A1* | 4/2012 | Ording ................. G06F 3/0486 |
| | | 715/790 |
| 2012/0290959 A1* | 11/2012 | Quine .................... G06F 3/048 |
| | | 715/765 |
| 2012/0304112 A1 | 11/2012 | Cutler |
| 2013/0346889 A1 | 12/2013 | Beringer et al. |
| 2014/0096056 A1 | 4/2014 | Latzina |
| 2015/0040002 A1 | 2/2015 | Kannan |
| 2015/0100905 A1 | 4/2015 | Latzina et al. |
| 2015/0324095 A1 | 11/2015 | Brown |
| 2016/0231869 A1* | 8/2016 | Kumar .................. G06F 3/0481 |
| 2018/0074656 A9* | 3/2018 | Czerwinski ........... G06F 3/0481 |

\* cited by examiner

PERSISTENT APPLICATION INTERFACE MANAGEMENT

CLAIM OF PRIORITY

This application claims priority under 35 USC § 120 to U.S. patent application Ser. No. 14/926,838, filed on Oct. 29, 2015, the entire contents of which are hereby incorporated by reference.

TECHNICAL FIELD

The present disclosure relates to computer systems and computer-implemented methods for managing and persisting application interfaces and windows into reusable arrangements.

Instantiated applications are generally associated with at least one graphical user interface (GUI). In executing and working with multiple applications, users may organize a set of instantiated GUIs in a particular window or work area to allow for efficient usage of display space.

SUMMARY

The present disclosure involves systems, software, and computer-implemented methods for managing and persisting application interfaces and windows into reusable arrangements. The present disclosure involves systems, software, and computer implemented methods for managing and persisting application interfaces and windows into reusable arrangements. In one example, a method may include identifying a work area of a first user, the work area including a presentation of a plurality of windows, each window associated with an application and receiving a selection of at least one of the plurality of windows in the work area. In response to receiving a request to associate the selected windows with a workplace schema, locations of the selected windows in the work area are determined. The determined locations of the selected windows are stored in a first workplace schema, where the first workplace schema stores the layout of the work area based on the determined locations of the selected windows.

DETAILED DESCRIPTION

Figure 1:
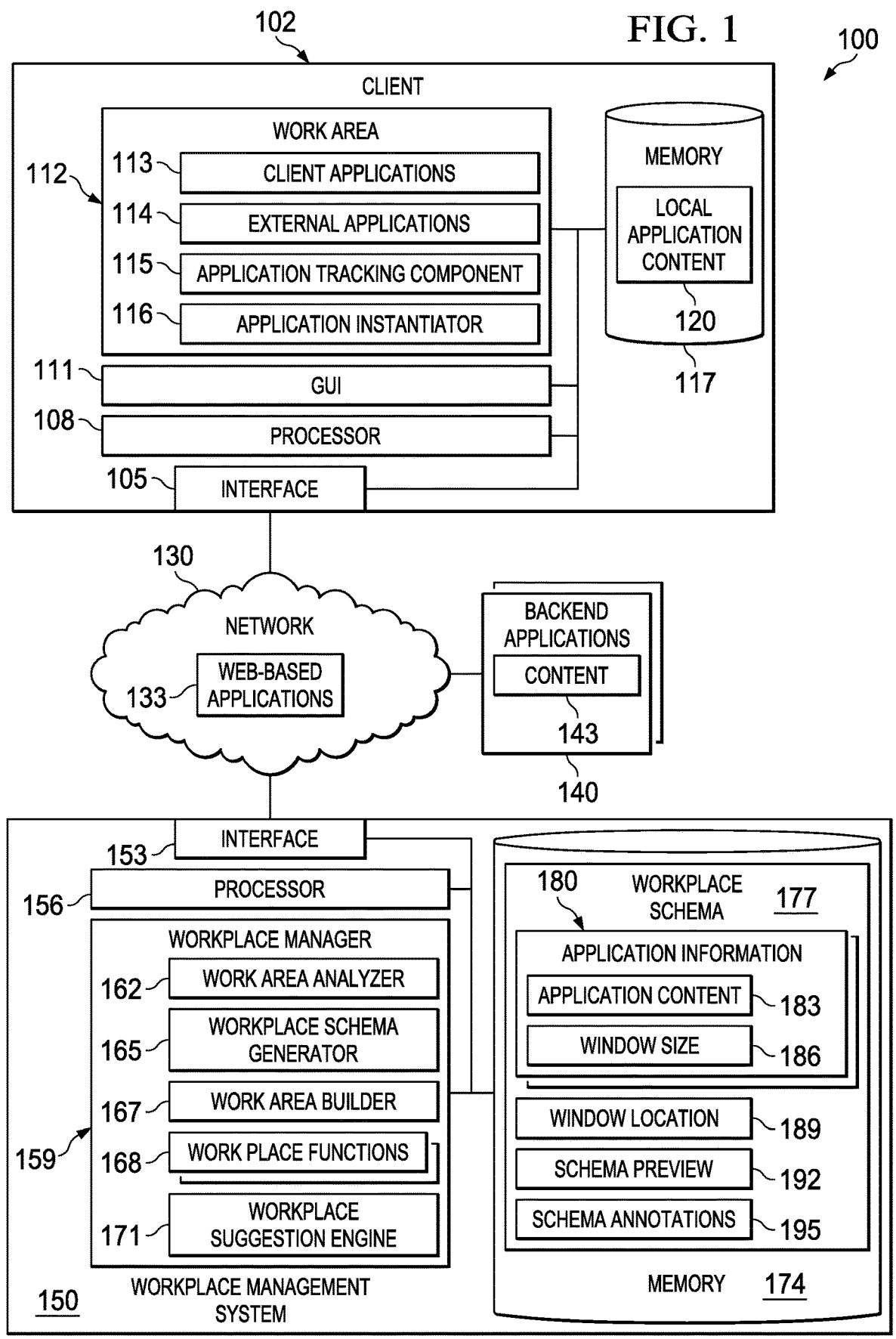
FIG. 1 is a block diagram illustrating an example system for managing and persisting application interfaces and windows into reusable arrangements.

The present disclosure describes example systems and methods for optimizing continuous queries for managing and persisting application interfaces and windows into reusable arrangements.

From the perspective of end users, in particular in business or personal computer settings, a need arises to frequently resume their previous work, either after a break, when they return to their computing system during the subsequent working day, or after working on an intermittent task. Given the current IT landscape, end users quite typically need to use and interact with a variety of software applications, e.g., an office suite or parts thereof which may include document processing or e-mail communication, Graphical User Interfaces (GUIs) for business applications, or small single-purposed applications or apps. In addition to this variety in terms of software types, users commonly need to access through them and interact with different software artifacts (e.g., objects and/or content, etc.) including, but not limited to, document files, pictures, e-mails, or screens with transactions, some of which are associated with specific applications and their application windows. For ease of reference, the terms "artifact," "object," and "content" may be used interchangeably and may mean one or all of the phrases. Additionally, the term "application window" refers to any visual GUI, including windows, widgets, icons, screens, or other suitable visual representations associated with a particular application.

This heterogeneity both in terms of applications and content poses a problem for end users insofar as they lack any opportunity to preserve a current and/or frequent work environment that includes the same set of applications and, in some cases, content, in order to resume their work or return to the common environment at a later point of time. While some users may try to circumvent this issue through hardware-based methods, using a sleep or hibernate function for their computer, this effort may be thwarted by any number of reasons. For example, certain applications may require online connectivity and may time out when using the hardware-based methods. In another example, users may need to intermittently release their work artifacts so others can continue working on them (e.g., while the initial users are absent from work). Further, users may work with many work environments throughout their computing interactions, such that the applications and content for a particular purpose or task are not always loaded or available. In still other instances, users may move between work environments (e.g., office and home, local and remote, etc.) where a particular work environment is not loaded or otherwise available. In other cases, after resuming work, the previous work artifacts may have become outdated or obsolete, e.g., based on updated data or changes made by one or more other users.

Another issue is that in business settings, the routine character of work requires users to recreate a previous or preferred work environment on their desktop (e.g., on the screen(s)), such that a convenient arrangement of application windows and, in some cases, related content within those windows, may be reused on a regular basis, such that constant loading and arranging may be performed by the users to place their desktop into such an arrangement and state. For example, a translations expert may reuse a particular application service, such as an online translation dictionary, in many instances, while exchanging the particular dictionary type (e.g., English-German in a first situation to English-French in a second situation) over time, as well as a Microsoft Word or other word processing document. A particular arrangement may be preferred by the user that allows for streamlined translation activities and operations.

Current solutions to "capture" a set of application windows and their content include taking a screen capture of the current desktop (thus preserving only the graphical aspects of the windows and neglecting hidden or partially hidden applications, as well as capturing all of the windows in the desktop) and using screen automation tools and/or macro recorders. In other words, the current solutions either remain purely on a visual level (i.e., entities such as applications and application windows are reflected only in a static image which cannot be addressed by visual interaction or by using textual reference commands) or, in the case of automation and macro-based approaches, interaction with the recordings is on a highly technical level, such that non-technical users are unable to generate and manage such a solution. Alternatively, some of the functionality may be used in a portal-type environment, where a single application can use various application parts (e.g., portlets) to provide the arrangement required. However, such systems provide little ability to freely add non-application part additions, and may be limited in the arrangements of application windows that can be maintained.

In the present solution, tools and systems for capturing a desktop, or work area for a particular user are provided, where the captured desktop (or portion thereof) is persisted as a workplace schema identifying the relative and/or absolute locations of one or more application windows within the work area, where the workplace schema can be easily restored at any time upon request by the user (or alternatively, automatically in response to a defined event, such as at start-up) by initiating the applications corresponding to the captured application windows at the locations stored in the workplace schema. In some instances, where particular content is associated with one or more of the applications in the workplace schema, the applications may be instantiated and/or progressed to a state or context where the application window of the particular applications reflect the particular content.

In particular, the present solution includes a workplace manager comprising a component for storing, displaying, modifying, and retrieving captures of one or more work areas and their corresponding workplace schemas. In some instances, each workplace schema may be associated with a list of items included in the particular workplace schema, where the list may store or present information regarding each application associated with the workplace schema and information associated with that application, including information on the application window (e.g., the window location relative to other windows and/or particular coordinates within the work area, the window size, etc.) and, in some instances, any content or state information associated with the application. Additionally, a preview version of the workplace schema may be stored in the workplace schema for quick navigation and review of particular schemas. In some instances, the preview of the workplace schema may be generated, at least partially, on-the-fly. Users can provide requests to the workplace manager to capture some or all of a particular work area to create a workplace schema, and can update and modify workplace schemas with the workplace schema able to identify and update such changes. In some instances, the workplace manager may allow users to enhance particular workplace schemas with annotations and/or other metadata. The annotations and/or metadata can be used by the user performing the enhancements as well as other users (e.g., where the workplace schemas are available to multiple users in a repository) to search or otherwise find generated workplace schemas.

When a particular workplace schema is selected for presentation by a user, the workplace manager can identify and instantiate the appropriate applications and application windows to be presented in the work area of the user, as well as any content or state in which at least some of the applications should be placed. The instantiated application windows can be arranged, or rearranged, in the locations defined in the workplace schema.

One of the benefits of the invention is that the workplace manager can accommodate captures of work area arrangements which otherwise would conflict with the visibility of a particular application and its application window. For example, this is the case when this particular application window or screen area is occluded by another window, but where the occluded application window or screen still belongs to a particular workplace scheme on the basis of the definition by the end user. Specifically, in a reuse situation, rather than using the typical controls for switching to a hidden application window in the background, the workplace scheme can be used additionally to select such hidden windows or, as a generalization, to navigate between application windows (e.g., those initially hidden or not). Moreover, for each entry in a particular workplace scheme, users can choose whether this entry pertains only to the application, or to an application with a particular content item. Alternatively, the opposite may be possible, such as where a content item is included in a particular workplace scheme without specific reference to an application, thereby allowing the user when loading that workplace schema not to have any particular application associated with this content item. This may be useful for web-based applications, where multiple browsers and/or dedicated applications may be used to view the content. Similarly, this may be useful when users work across systems or devices. For example, in a first instance on a desktop or non-mobile device, web pages may be opened by Internet Explorer, while in a second instance, web pages may be opened by a mobile browser, e.g., Apple's Mobile Safari.

Various scenarios may use the described tools to include distributed user interaction. In a first case, an end user is enabled to work with the workplace manager and view the immediate effects in his or her work environment, where actual application windows are manipulated as described. In some instances, the end user could choose to solely work with the workplace manager to work on workplace schemes for later use without interacting with the applications themselves—that is, only the design of the workplace schema is used Direct effects on the applications themselves may be hidden while the workplace schema is designed. In a distributed user scenario, other users, such as technical users, could use command languages to make changes with respect to the workplace schemes and provision them to particular users, user types, or users in particular jobs (e.g., manager-specific, executive-specific, or other types of users). For example, the application windows included in a schema provided to an executive may be related to a particular view of a set of dashboards and metrics that can be used to easily view the status of a particular business or system. Similarly, a manager-specific schema may provide applications and application states related to one or more managerial tasks. In some instances, the arrangements may be made using a different or alternative interface, which may optionally be monitored in the workplace manager. The benefits of the described tools allow team collaboration in using the workplace schemes as a shared and intermediate object for the purpose of manipulating and providing enhanced work areas and work environments.

In further and alternative implementations, end users may share and exchange workplace schemas among each other. In this way, users can exchange and share access to particular sets of applications and/or specific documents required to or enhancing their ability to perform their jobs. In some instances, particular states of the applications, in addition to their layout, may be shared to allow instant access to a work area of another user. The receiving user would then be able to automatically retrieve the associated documents without manually performing the opening and arranging operations. Various other benefits and advantages would be understood by a person of skill in the art, and the descriptions herein are not meant to be limiting, but rather examples of possible implementations.

Turning to the illustrated embodiment, FIG. 1 is a block diagram illustrating an example system 100 for managing and persisting application interfaces and windows into reusable arrangements. As illustrated in FIG. 1, system 100 is a client-server and device-client system capable of executing local and remote applications at a client 102 or at other locations, where each of the applications is executed in a work area of a particular user. The workplace management system 150 can monitor the applications and application windows associated with a particular work area and, in response to a request from the client 102, can capture and store information on the applications, window arrangements of the application windows corresponding to those applications, and content associated with some or all of the applications. The captured information can be stored in a workplace schema 177 that can be used to recreate the captured work area at a later time to provide convenience and consistent operations associated with the applications. In some instances, the workplace management system 150 may be located at a particular client 102 (e.g., as a local application) or the workplace management system 150 may be remote from client 102 as illustrated in FIG. 1.

In general, system 100 includes or is communicably coupled with the client 102, the workplace management system 150, and one or more backend applications 140, where these systems are connected, at least in part, by network 130, which itself may provide one or more cloud- and/or web-based applications 133. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, client 102 and workplace management system 150, among other illustrated components, may be any computer or processing device such as, for example, a blade server, general-purpose personal computer (PC), Mac®, workstation, UNIX-based workstation, or any other suitable device. Moreover, although FIG. 1 illustrates a single workplace management system 150, workplace management system 150 can be implemented using two or more systems, as well as computers other than servers, including a server pool. Alternatively, the functionality of the workplace management system 150 may be available locally at client 102, at network 130 as a cloud-based solution, or in any other suitable location. Further, while the backend applications 140 are illustrated as remote from the workplace management system 150, in some instances, the backend applications 140 may be located and executed at the workplace management system 150, including where the workplace management system 150 represents a portion of a larger system. The present disclosure contemplates computers other than general purpose computers, as well as computers without conventional operating systems.

In general, the workplace management system 150, as described above, is a system used to capture workplace schemas as requested by particular users, where the workplace schemas define a specific set of executing applications (or equivalents) and an arrangement of application windows associated with those applications. In some instances, the workplace management system 150 can capture state and content information associated with those applications as well. In doing so, particular views and applications sets can be easily saved and recalled or restored at a later time, allowing users the ability to conveniently generate identical work areas to those previously captured. The workplace management system 150 can access and/or determine the applications included within a particular work area used by a user at client 102 or accessed at a centralized system. As noted, the workplace management system 150 may be located at any appropriate system. Further, portions of the workplace management system 150 may be located apart from the workplace management system 150 in some instances, such as through a remote agent, module, or other component. Those remote components may be used to provide current work area information to the workplace management system 150 for storage in a particular workplace schema 177, as well as to receive information on how to recreate a view and arrangement matching those of previously stored workplace schema 177.

As illustrated, the workplace management system 150 includes an interface 153, a processor 156, a workplace manager 159, and a memory 174. The interface 153 is used by the workplace management system 150 for communicating with other systems in a distributed environment—including within the environment 100—connected to the network 130, e.g., client 102, backend applications 140, web-based applications 133, as well as other systems communicably coupled to the network 130. Generally, the interface 153 comprises logic encoded in software and/or hardware in a suitable combination and operable to communicate with the network 130. More specifically, the interface 153 may comprise software supporting one or more communication protocols associated with communications such that the network 130 or interface's hardware is operable to communicate physical signals within and outside of the illustrated environment 100. Still further, the interface 153 may allow the workplace management system 150 to create one or more ad hoc or dedicated connections to one or more of the clients 102, backend applications 140, and/or the web-based applications 133, among others.

Network 130 facilitates wireless or wireline communications between the components of the environment 100 (e.g., between the clients 102 and the workplace management system 150, between the workplace management system 150 and the applications 133, 143, as well as with any other local or remote computer, such as additional clients, servers, or other devices communicably coupled to network 130, including those not illustrated in FIG. 1. In the illustrated environment, the network 130 is depicted as a single network, but may be comprised of more than one network without departing from the scope of this disclosure, so long as at least a portion of the network 130 may facilitate communications between senders and recipients. In some instances, one or more of the illustrated components (e.g., the web-based application 133 as illustrated, as well as the workplace management system 150 currently shown separate from network 130) may be included within network 130 as one or more cloud-based services or operations. The network 130 may be all or a portion of an enterprise or secured network, while in another instance, at least a portion of the network 130 may represent a connection to the Internet. In some instances, a portion of the network 130 may be a virtual private network (VPN). Further, all or a portion of the network 130 can comprise either a wireline or wireless link. Example wireless links may include 802.11a/b/g/n/ac, 802.20, WiMax, LTE, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the workplace management system 150 includes a processor 156. Although illustrated as a single processor 156 in FIG. 1, two or more processors 156 may be used according to particular needs, desires, or particular implementations of the environment 100. Each processor 156 may be a central processing unit (CPU), an application specific integrated circuit (ASIC), a field-programmable gate array (FPGA), or another suitable component. Generally, the processor 156 executes instructions and manipulates data to perform the operations of the workplace management system 150. Specifically, the processor 156 executes the algorithms and operations described in the illustrated figures, including the operations performing the functionality associated with the workplace management system 150 generally, as well as the various software modules (e.g., the workplace manager 159 and its various components), including the functionality for sending communications to and receiving transmissions from the various systems involved in the workplace scenario capturing and restoration.

As noted, the workplace management system 150 includes the workplace manager 159, where, in the illustrated example, one or more work areas associated with users can be monitored for potential capture of corresponding workplace schemas 177, as well as restoration or instantiation of particular workplace schemas 177. Those users may be associated with client 102 in some instances, as well as other suitable systems. The workplace manager 159 may be assisted by a plurality of components to perform its operations (although such components may be included in a single component in some instances), including a work area analyzer 162, a workplace schema generator 165, a work area builder 167, one or more workplace functions 168, and a workplace suggestion engine 171. As these components may each correspond with one or more external systems, the workplace manager 159, e.g., via interface 153, may provide one or more interfaces allowing communications and exchanges of information with other systems.

In general, the workplace manager 159 represents an application, set of applications, software, software modules, or combination of software and hardware used to manage the operations associated with creating, modifying (including deleting), and using workplace schemes 177 for the illustrated system. In the illustrated solution, as described above, the workplace management system 150 is shown as a single system with the workplace manager 159 executing the primary activities thereof. In many implementations, the workplace management system 150 and/or workplace manager 159 may be a set of related, remote, or individual components used to perform the described functionality of the single system 150 and/or workplace manager 159.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The work area analyzer 162 can perform operations associated with analyzing work areas associated with one or more users, and can assist in determining particular information about the applications and application windows located in a particular work area being analyzed. The work area analyzer 162 may execute in the background until a request to generate a new workplace schema 177 is received. When the request is received, the work area analyzer 162 can identify one or more application windows within the work area to be included in the new workplace schema 177. In some instances, each of the current windows and corresponding applications may be included in a new schema 177, while in other instances, a subset of the windows (i.e., not all available windows) may be selected for inclusion in the new workplace schema 177. In both situations, the work area analyzer 162 can identify particular applications associated with the selected windows, as well as the relative and/or absolute locations within the work area at which the corresponding application windows are located. Additionally, the work area analyzer 162 may be able to determine a state of a particular application or content associated with the particular application at the time of the capture. For example, if the application is a word processor, the document open in the word processor at the time of capture may be identified. In some instances, the state or content of the application may be determined based on local information (e.g., information located at the client 102 or the location where the work area is hosted), or, alternatively, the work area analyzer 162 may obtain the state and/or content information from the source application in cases of remote execution.

The workplace schema generator 165 performs operations associated with taking the information identified and captured by the work area analyzer 162 and storing said information into a workplace schema 177 within memory 174. Specifically, the information identified and captured by the work area analyzer 162 is the input to the workplace schema generator 165 to create a new workplace schema 177. The workplace schema generator 165 can store information about each of the applications and the application windows captured in the work area and stored each in the workplace schema 177 as application information 180, where multiple applications can be listed. For each application, information associated with the application content 183 and the window size 186 at the time of capture can be included in the application information 180. In some instances, absolute window location information may also be stored with the application information 180, although as illustrated, the window location 189 is stored apart from the application information 180 in FIG. 1. In some instances, the window location 189 information may define absolute and/or relative location information for the various windows associated with the applications. In some instances, both the absolute and relative locations may be stored. The absolute information may be of assistance where the work area in which a later representation of a particular workplace schema 177 is built is the same size as the work area in which the workplace schema 177 was captured. The relative location information may allow non-matching work areas to also present the windows in an arrangement similar to the arrangement in which they were captured. In some instances, where absolute location information is captured, the workplace manager 159 (and the work area builder 167) can resize the absolute locations to meet the current work area viewing area. The schema preview 192 can represent a thumbnail of the workplace schema 177 or other preview of the schema 177, and can allow users to view the overall illustration of the workplace schema 177 prior to selecting the workplace schema 177 for building at runtime. In some instances, the miniature windows presented in the schema preview 192 may be editable or movable, such that moves of the windows in the schema preview 192 can be reflected in changes to the windows presented in the work area. The schema annotations 195 may be notes, metadata, titles, or other types of annotations provided by users when generating or working with the workplace schema 177. The annotations 195 can be used to search among a plurality of workplace schema 177, generate suggestions for users as to potential schemas 177 to employ, and/or provide additional explanation as to a particular subject or project for which the schema 177 may be useful.

The work area builder 167 performs operations associated with restoring or building work areas with the particular applications associated with an identified workplace schema 177. In other words, in response to a selection by a user of a particular workplace schema 177, the work area builder 167 can identify the applications associated with the workplace schema 177 (e.g., based on the application information 180), determine application content 183 (or state) where the application is to be instantiated to (if available), a window size 186, and window locations 189 for each of the application windows associated with the applications in the workplace schema 177. As noted, one or more of the applications associated with the workplace schema 177 may be remotely executed applications, including the illustrated web-based application 133 and/or the one or more backend applications 140. The work area builder 167 or another component of the workplace manager 159 may perform operations to instantiate said applications within the work area, where the application windows correspond to the sizes 186 defined in the workplace schema 177 and in the correct locations 189, as well as with the correct content 183.

Workplace functions 168 represent one or more functions for modifying a currently selected workplace schema 177. In some instances, the functions 168 may include one or more rearrangement functions that perform window layout alterations in an attempt to automatically optimize the application windows associated with a workplace schema 177. Functions may include making a primary application window (based on user interaction) the center of the work area and placing other application windows around the primary window (or, alternatively, removing them again). Other functions may base the rearrangement on alternative factors. In some instances, two or more workplace schema 177 may be presented outside of the work area as options to be used. The functions 168 may modify the presentation of those options in addition to the presentation of windows within a particular workplace schema 177.

The workplace suggestion engine 171 can perform operations for suggesting one or more available and pre-defined workplace schema 177 associated with one or more of the applications currently being used in the work area. For example, the work area analyzer 162 may identify a set of applications and application windows currently used in the work area. Based on the analysis, the workplace suggestion engine 171 may identify one or more potential workplace schema 177 where the applications currently used are also included. The suggestions may be provided at a side window adjacent to the work area, as a pop-up on top of the work area, or at any other suitable location. In response to the suggestion, a user can choose to use one of the suggested workplace schemas 177, where the work area builder 167 can, in response, generate an instance of the workplace schema 177 in the work area. In some instances, the suggested workplace schema 177 may be generated by the same user to whom they are being suggested. In other instances, workplace schema 177 generated by other users may be included in the suggestion, where the instantiation of such workplace schema 177 can provide similar work areas as other users had selected. In some instances, abbreviated versions of such workplace schema 177 may be provided, such as where protected or confidential information is part of the associated application content 183. In such instances, the current context, state, or content of the identified applications currently used in the work area may be substituted for that in the suggested and selected workplace schema 177. In some instances, the workplace suggestion engine 171 may be associated with a search engine capable of searching one or more workplace schema 177 based on search criteria provided by the user. In those instances, the search may be based on the applications searched, particular application content, or keywords included in schema annotations 195, as well as based on other information.

The workplace management system 150 also includes memory 174, or multiple memories 174. The memory 174 may include any memory or database module(s) and may take the form of volatile or non-volatile memory including, without limitation, magnetic media, optical media, random access memory (RAM), read-only memory (ROM), removable media, or any other suitable local or remote memory component. The memory 174 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the workplace management system 150. Additionally, the memory 174 may store any other appropriate data, such as VPN applications, firmware logs and policies, firewall policies, a security or access log, print or other reporting files, as well as others. For example, memory 174 can store the workplace schema 177 described above, as well as any other information relevant to the workplace manager 159.

Illustrated environment 100 includes client 102 associated with a particular user. The user may use the client 102 as an entry point into one or more local or remote applications, and can interact with multiple applications in a work area. In the illustrated example, the client 102 may execute a local work area 112 including one or more applications. In the illustrated work area 112, the client 102 is associated with one or more client applications 113 and one or more external apps 114 (e.g., web-based application 133 or backend applications 140). Any suitable combination of applications executing or associated with a particular work area 112 may be used, including all local client applications 113 or all remote external apps 114. Each of the applications executing in the work area 112 may be associated with an application window used to present information associated with that application to the user, such as in the GUI 111. As noted, the workplace manager 159 can, through its functionality and/or that of its various illustrated components (including components local to the client 102, e.g., application tracking component 115 and application instantiator 116, described below), can identify particular applications executing in the work area 112 to generate one or more workplace schemas 177. Additionally, the workplace manager 159 can receive modifications related to a particular schema 177 via modifications made at the client 102, and can update the underlying schema 177 based on those changes. Still further, the workplace manager 159 can load new instances of selected schemas 177 to the work area 112 as appropriate.

The illustrated client 102 is intended to encompass any computing device such as a desktop computer, laptop/notebook computer, mobile device, smartphone, personal data assistant (PDA), tablet computing device, one or more processors within these devices, or any other suitable processing device. In general, the client 102 and its components may be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer. In some instances, the client 102 may comprise a computer that includes an input device, such as a keypad, touch screen, or other device that can interact with the applications 113 and apps 114 in the work area 112, and an output device that conveys information associated with the operation of the applications and their application windows to the user of the client 102. Such information may include digital data, visual information, or a GUI 111, as shown with respect to the client 102. Specifically, the client 102 may be any computing device operable to connect to or communicate with the workplace management system 150, the client applications 113 and the external apps 114, other clients 102, and/or other components via network 130, as well as the with the network 130 itself, using a wireline or wireless connection. In general, client 102 comprises an electronic computer device operable to receive, transmit, process, and store any appropriate data associated with the environment 100 of FIG. 1. In particular, client 102 executes the work area 112 and the applications associated with the work area 112.

As illustrated, client 102 includes an interface 105, a processor 108, a graphical user interface (GUI) 111, a work area 112, and memory 117. The interface 105 and processor 108 may be similar to or different than interface 153 and processor 156. In general, processor 108 executes instructions and manipulates data to perform the operations of the client 102. Specifically, the processor 108 executes the algorithms and operations described in the illustrated figures and associated with the client 102, including the operations performing the functionality associated with the work area 112 and the illustrated client applications 113 and external applications 114. Further, memory 117 may be similar to or different than memory 174. While illustrated generally, memory 117 may store or maintain information related to local application contents 120 (e.g., a current state of a client application 113 executed locally), as well as other suitable data.

The work area 112 may be an area within the desktop or operations of the client 102 where instances of one or more applications (e.g., client applications 113 or external applications 114, such as web-based application 133 or backend applications 140) are executed. In some instances, the work area 112 may be remotely connected to one or more external applications 114 such that application windows associated with the various executing applications are presented to the user (e.g., via GUI 111), allowing for interaction with the various applications via said application windows. The client application 113 and the external applications 114 may be any suitable software executable at the client 102, or which can be presented via the work area 112 during a remote execution of the client application 113 and/or the external applications 114. Modifications to the application windows associated with the applications can be made, including movement from a first location in the work area 112 to a second location, as well as resizing the particular application windows. Further, interactions with the application windows (and the corresponding applications) can cause changes in state and content for the various applications. In some instances, the client application 113 and/or the work area 112 may be web browser or an application including built-in web browser functionality, such that web-based applications 133 and backend applications 140 may be accessed and executed.

Work area 112 may also include one or more components used locally to manage the work area 112 in distributed implementations. As illustrated, an application tracking component 115 may be used to identify the current applications in the work area 112, allowing for particular sets of applications to be captured and/or monitored. The application tracking component 115 may be a local component of the workplace manager 159 and/or the work area analyzer 162. Additionally, work area 112 may include an application instantiator 116. Similar to the application tracking component 115, the application instantiator 116 may be a local component used to instantiate the one or more client applications 113 and external applications 114 within the work area 112. The application instantiator 116 may be a local component of the work area builder 167.

GUI 111 of the client 102 interfaces with at least a portion of the environment 100 for any suitable purpose, including generating a visual representation of the work area 112, the client application(s) 113, and/or the external applications 114. In particular, the GUI 111 may be used to view application windows associated with the applications executing in association with the work area 112, as well as to view and interact with various Web pages and applications located locally to the client 102, externally to the client 102 but within illustrated environment 100, or externally to environment 100. Generally, the GUI 111 provides the customer with an efficient and user-friendly presentation of data provided by or communicated within the system. The GUI 111 may comprise a plurality of customizable frames or views having interactive fields, pull-down lists, and buttons operated by the user. For example, the GUI 111 may provide interactive elements that allow a user to view or interact with information related to the operations of the process associated with the property analysis process. The GUI 111 may present information associated with the work area 112, the applications (113, 114), and/or the workplace manager 159 and its associated components. In general, the GUI 111 is often configurable, supports a combination of tables and graphs (bar, line, pie, status dials, etc.), and is able to build real-time portals, application windows, and presentations. Therefore, the GUI 111 contemplates any suitable graphical user interface, such as a combination of a generic web browser, intelligent engine, and command line interface (CLI) that processes information in the platform and efficiently presents the results to the user visually.

The web-based applications 133 illustrated in network 130 and the backend applications 140 may be any suitable applications executed remotely from the client 102, where information and application data associated with the applications 133, 140 are transmitted to the work area 112 and client 102 for presentation. Both types of applications 133, 140 may be accessed in some instances by a generic web browser, or alternatively, using a dedicated application shell or component for presenting information associated with and interacting with the applications 133, 140 at the client 102. As illustrated, the backend application 140 may be associated with particular content 143 reflecting a state of or object/artifact/content associated with an instance of the backend application 140 executing at the client 102. The content 143, as well as content associated with the web-based application 133 (not shown) and the local application content 120, may be captured or capturable by the workplace manager 159 (e.g., by the work area analyzer 162), such that the captured content (including state, particular documents open with the application, etc.) may be stored in and/or associated with the workplace schema 177. In those instances, the captured content may be included in the initialized application of a particular built workplace schema 177 presented at the client 102.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
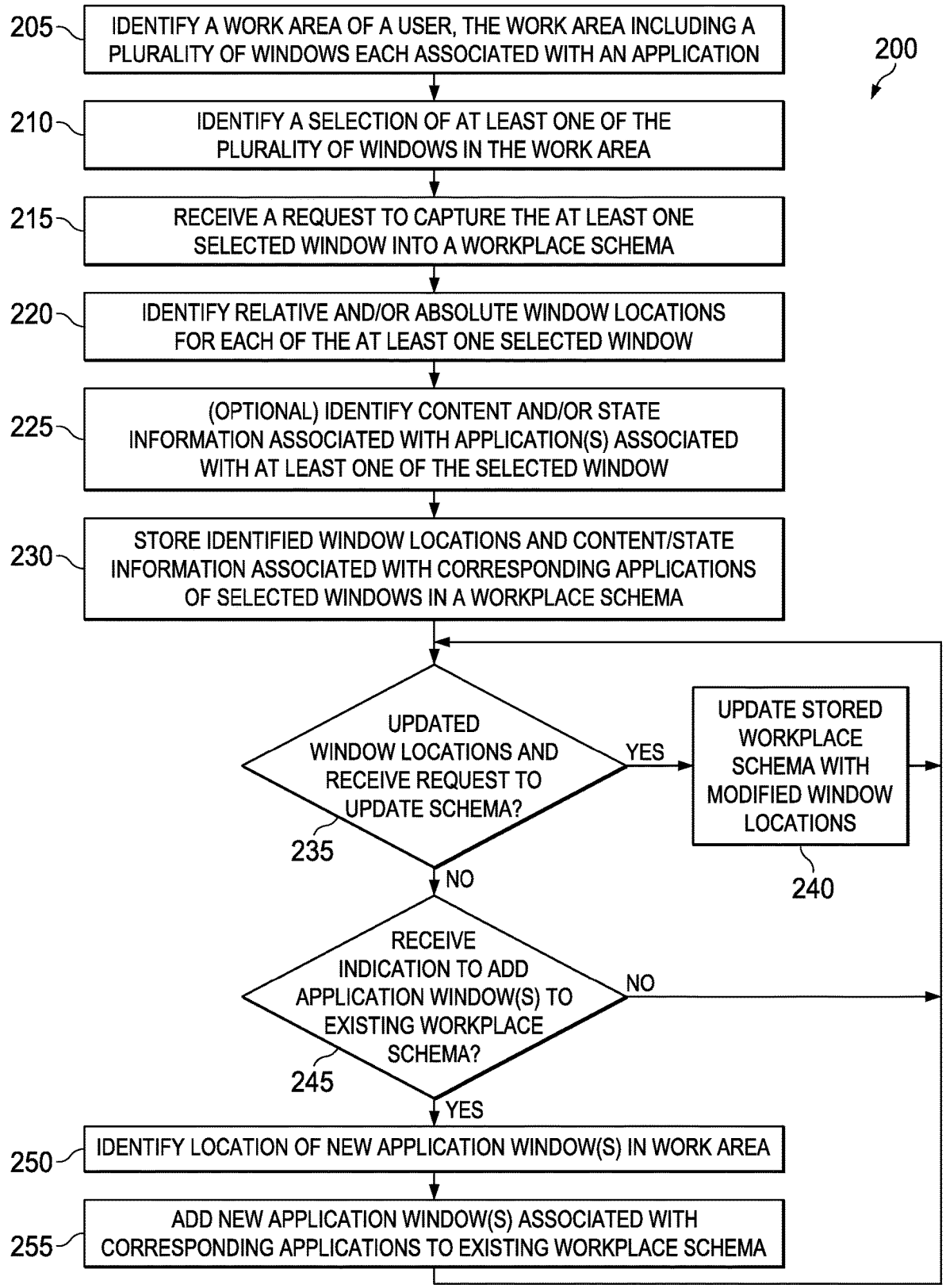
FIG. 2 is an illustration of example operations for capturing a persistence workspace schema associated with one or more applications and their respective graphical user interface (GUI) windows.

FIG. 2 is an illustration of example operations 200 for capturing a persistent workspace schema (e.g., workplace schema 177) associated with one or more applications and their respective graphical user interface (GUI) windows. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate. In the described method 200, the operations may be performed at a particular client, the workplace management system, or any other suitable location.

At 205, a work area of a user is identified, where the work area includes a plurality of application windows, each associated with an executing application. The work area may be a presented portion of a desktop or screen, where the application windows are presented by a GUI allowing for interaction with the applications via the application windows. The user associated with the work area may interact with some or all of the application windows and their underlying applications via input devices. For example, the application windows may be associated with particular applications (e.g., Microsoft Word, SAP HANA-based applications, databases, spreadsheets, etc.), analytics systems, web browsers, or any other suitable application.

At 210, a selection of at least one of the plurality of application windows included in the work area may be identified. In some instances, all of the application windows may be selected. In others, a subset of at least one but less than all may be selected. In some instances, the selections may be made by dragging-and-dropping the application windows into a certain location on or outside of the work area, by clicking or touching the particular windows after initiating a selection process, or by any other suitable method. At 215, a request to capture the at least one selected application window into a new workplace schema is received.

In response to receiving the request, at 220, the particular applications associated with the selected application windows, as well as the particular position and size of the selected application windows, is identified. In some instances, the particular position may be an absolute position within the work area or a position relative to at least one other selected application window within the work area. In some cases, both relative and absolute position information may be identified for the workplace schema. Further, in some instances, content and/or state information associated with the applications corresponding or associated with at least one of the selected application windows may also be identified. In some instances, such as when the application associated with a particular application window is executed locally, state and content information may be obtained from a local store or runtime environment. In other instances, state and/or content information may be obtained from a remote location, such as when one or more web-based applications or other externally executed applications are associated with the selected application windows. At 230, the information identified at 220 (i.e., the application and the application window size and location information) and, in some cases, at 225 can be stored in a new workplace schema. In some instances, one or more annotations may be provided by the user requesting the creation of the workplace schema and added to the stored record. Further, annotations may be added at any time during interactions with the created workplace schema.

After the creation of the workplace schema, the user may continue to work and interact with the applications and windows associated with the workplace schema. During that operation, one or more modifications to the windows and applications may occur, as well as additions to the workplace schema. At 235, a determination is made as to whether one or more changes or updates to the locations and/or sizes of the windows are made, and further, whether a request to update the workplace schema is received. If so, method 200 continues at 240, where the updated locations and/or sizes of the application windows can be stored in the workplace schema (e.g., can replace the prior version of the workplace schema). After updating, method 200 returns to 235. If no modifications to the window locations and/or sizes are received and/or no request to update the schema is received, method 200 continues at 245. At 245, a determination is made as to whether additional application windows not previously included in the workplace schema are selected and requested to be added to the workplace schema. As noted, a subset of application windows in the work area can be added instead of every application window available. Additionally, new applications and application windows may be added to the work area after the initial generation of the workplace schema. The indication at 245 is to add an application window into the workplace schema that was not previously included therein. If no request to add windows is received, method 200 can return to 235. If, however, the request to add the new window or windows is received, method 200 continues at 250, where the location and size of the selected application window or windows is identified. In addition to the location and size, content or state information associated with the window and its application can be identified as well. At 255, the new application window or windows and their corresponding applications are added to the existing workplace schema.

In some alternative implementations, method 200 can begin with a customer specifying or identifying a new or existing workplace schema. For specifying or identifying, the method 200 can allow users to enter the name of a new or existing workplace schema to be created and/or modified by the additional operations of the illustrated method. The user could then determine how to change, modify, or otherwise add to the empty or existing contents of the specified/identified workplace schema. In some instances, by identifying an existing schema, a new instance or version of the identified workplace schema may be created to allow for multiple instances or versions of the identified workplace schema to exist.

Figure 3:
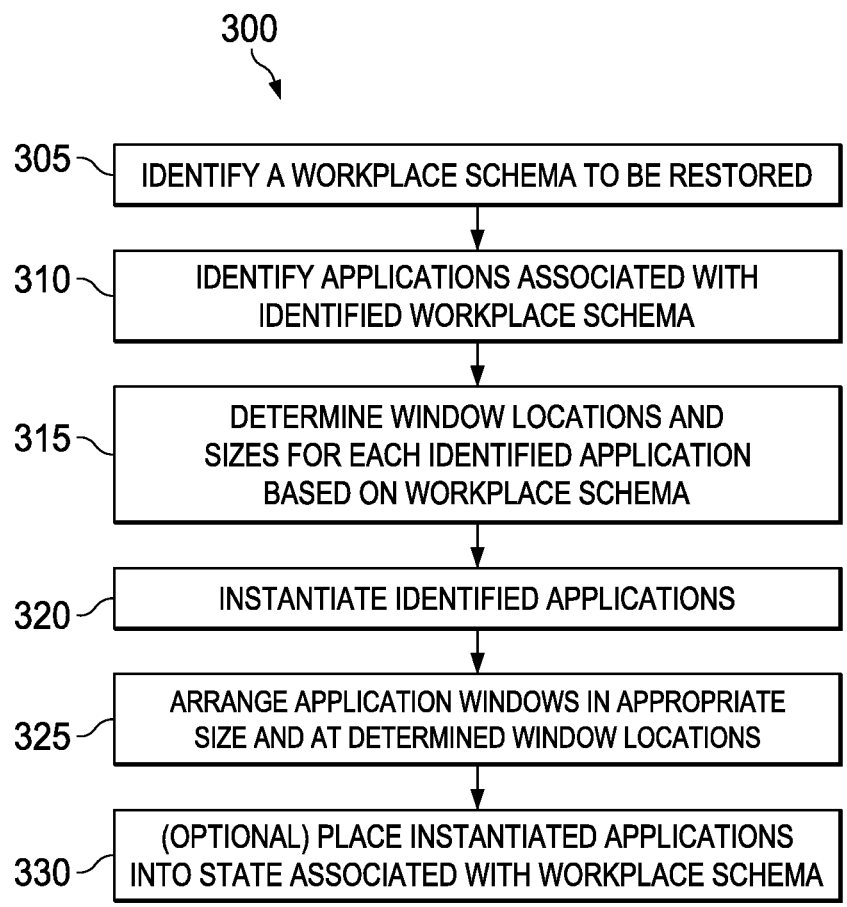
FIG. 3 is an illustration of example operations for restoring a previously captured workspace schema associated with one or more applications and their respective graphical user interface (GUI) windows.

FIG. 3 is an illustration of example operations 300 for restoring a previously captured workspace schema associated with one or more applications and their respective graphical user interface (GUI) windows. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. In the described method 300, the operations may be performed at a particular client, the workplace management system, or any other suitable location. Additionally, the workplace schemas associated with method 300 may be generated by any suitable method, including the operations described in FIG. 2.

At 305, a workplace schema may be identified by a user or the work area for restoration within the work area. In some instances, workplace schemas may be requested by a user, while in other instances, particular workplace schemas may be automatically identified for instantiation upon an event, such as a start-up event. The identified workplace schema may be associated with a role, a user, or a group of users, and may be made available to not only the creator of the workplace schema, but one or more other authorized and/or suitable users.

At 310, the applications associated with the identified workplace schema are identified. At 315, the window locations within the work area (e.g., relative and/or absolute locations) and the window size are identified from the identified workplace schema. At 320, the identified applications are instantiated, where at 325 the application windows associated with the instantiated applications are sized corresponding to the workplace schema values and arranged in the work area at the appropriate locations. In some instances, the instantiated applications may be placed into a state or may open with particular content as defined in the workplace schema at 330. In some instances, only a subset of the instantiated applications may be associated with state or content information in the workplace schema, such that only those applications are instantiated to a particular state.

Figure 4:
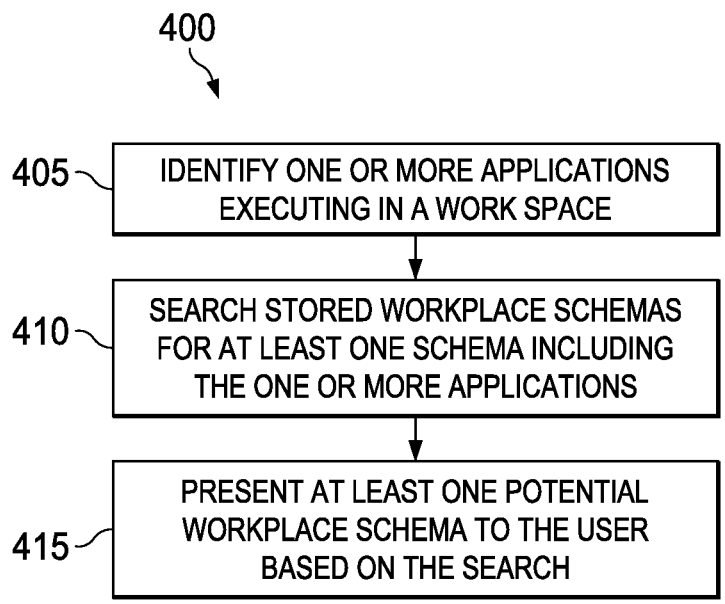
FIG. 4 is an illustration of example operations for identifying at least one suggested workplace schema based on currently executing applications.

FIG. 4 is an illustration of example operations 400 for identifying at least one suggested workplace schema based on currently executing applications. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate. In the described method 400, the operations may be performed at a particular client, the workplace management system, or any other suitable location. Additionally, the workplace schemas associated with method 400 may be generated by any suitable method, including the operations described in FIG. 2.

At 405, one or more applications are identified as executing in or associated with a work space. At 410, either automatically or in response to a user request, the stored workplace schemas can be searched to identify at least one schema that includes at least one of the one or more executing applications. Various metrics and weighting factors can be used to determine which schemas from a plurality of stored workspace schemas are a best match to the applications within the work area. For example, matches in the search may be prioritized based on a number of applications in common with those being executed in the work area. In some instances, search results may be prioritized based on a determination of a particular task being performed by the user, including whether a particular workplace schema is associated with annotations associated with the task. Any other suitable search functionality and search result prioritization may be used in different implementations. Additionally, users may identify particular search criteria (e.g., includes application X, etc.) to assist in the search functionality. At 415, at least one potential workplace schema can be provided to the user based on the search.

Figure 5:
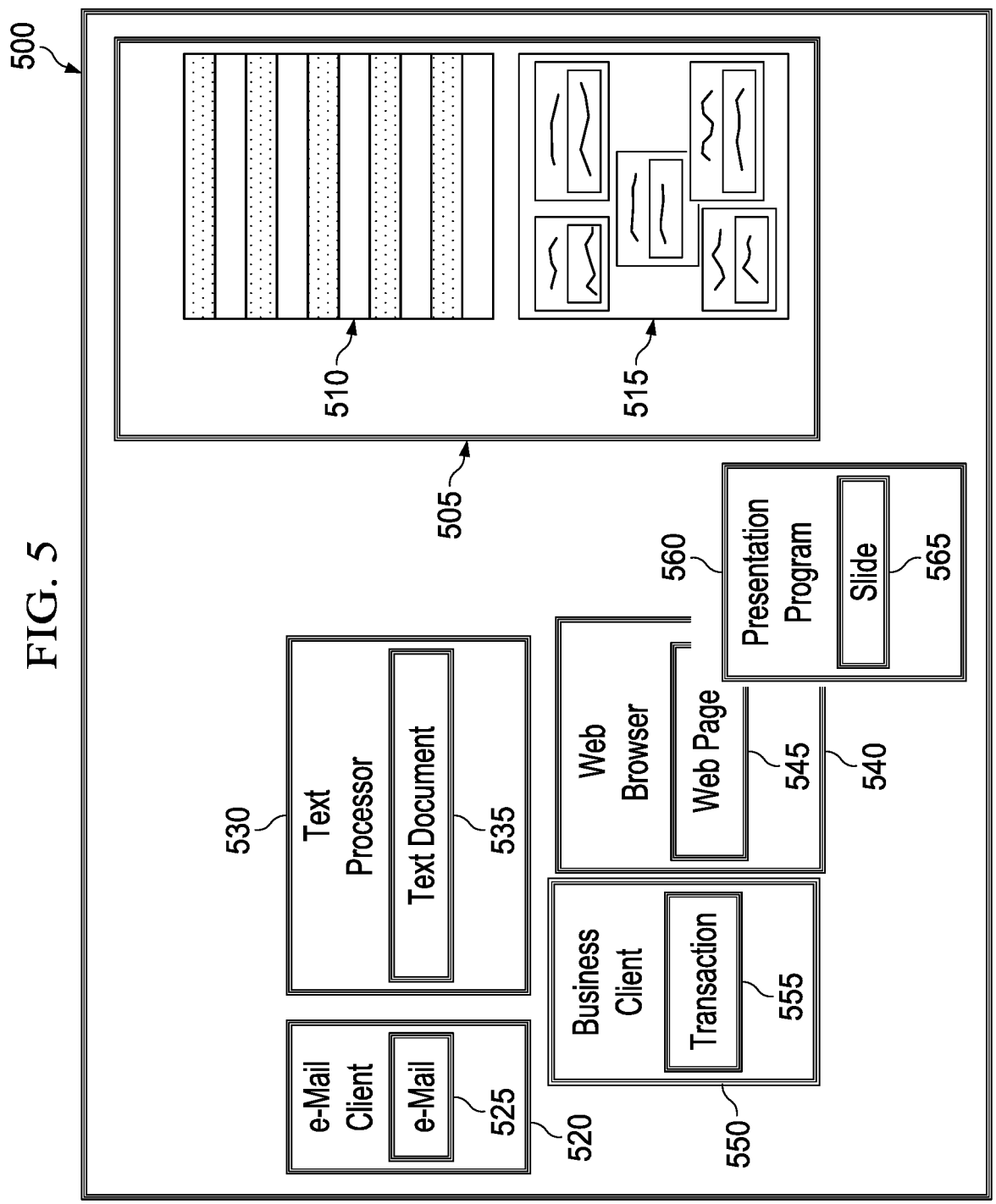
FIG. 5 illustrates an example screenshot of an implementation where a captured workplace schema is presented

FIG. 5 illustrates an example screenshot of an implementation where a captured workplace schema is presented. As illustrated, a work area 500 includes a plurality of application windows 520, 530, 540, 550, and 560, along with a workplace manager menu 505. As illustrated, the workplace manager menu 505 includes a list 510 and an analog preview 515 of the work area and/or the workplace schema associated with the workplace schema. The list 510 can include an informational list of application window/applications included in the workplace schema, as well as information related to the application, content, window size, and window position (e.g., relative location and/or particular coordinates within the work area). By selecting particular entries in the list 510, additional details about the corresponding application window and application may be presented or otherwise made available. The analog preview 515 of the workplace schema provides a thumbnail or quick view of the current workplace schema. In some instances, additional previews of previous workplace schema and other available workplace schema may also be presented by the workplace manager menu 505. The illustration in FIG. 5 of the list 510 is meant to be illustrative, and may, in other implementations, vary in presentation and content. For example, the list 510 may not be limited to the display of application windows. List 510 may include or be associated with a toggle allowing the user to switch between a display of application windows in a particular workplace schema and a list of available workplace schemas. Further, the list 510 could be displayed as a tree with branches and/or expandable/collapsible entries to present both the full set of available workplace schemas and their associated application windows. In such instances, particular workplace schemas may be expandable and collapsible to view or hide the application windows associated therewith. Alternatively, each workplace schema could be displayed as a header field, with subordinate application windows displayed as line items below the corresponding workplace schema in which they appear.

As illustrated, the application windows 520, 530, 540, 550, and 560 may each be associated with particular content. For example, the e-Mail client 520 is presenting a particular e-Mail message 525, while text processor 530 has a particular text document 535 open. Similarly, business client 550 presents a particular transaction 555, web browser 540 presents a particular web page 545, and presentation program 560 includes one or more slides 565. The workplace schema may define one or more of these particular contents or artifacts when generated, such that restoration or opening of the workplace schema results in the applications corresponding to the application windows being instantiated with those contents or artifacts made available.

While the workspace schema illustrated in FIG. 5 includes each of the application windows shown in the work area 500, alternative implementations may include less than all of the application windows in the application schema. In such instances, the analog preview 515 may not match the actual application windows open in the work area, as only those included in the previewed workplace schema may be presented in the analog preview. Operations for adding one or more additional windows not originally included in the workplace schema may be provided, such that upon proper selection of a non-included window and a request to include the window, the workplace schema can be updated accordingly.

Figure 6:
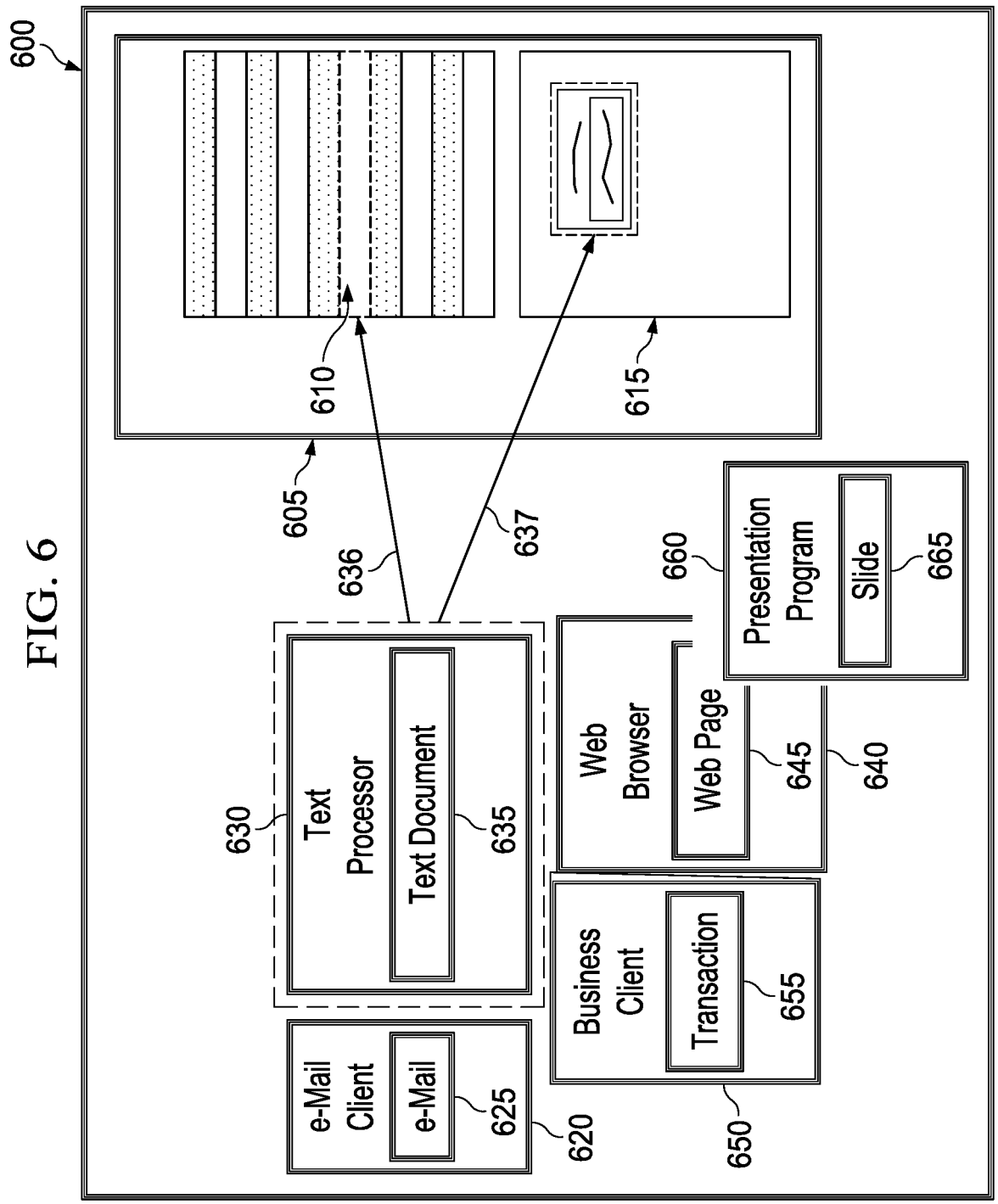
FIG. 6 illustrates an example screenshot and actions relating to capturing one of a plurality of windows executing in a work area 600 into a new workplace schema.

FIG. 6 illustrates an example screenshot and actions relating to capturing one of a plurality of windows executing in a work area 600 into a new workplace schema. While the illustration of FIG. 6 is similar to FIG. 5, in this illustration no existing workplace schema is available for the applications/application windows in the work area. Here, a user can select a particular application and application window from within the work area 600. The selection may include a click or gesture related to the application window 630, a drag of the application window 630 into the list 610 (illustrated by arrow 636) or a draft of the application window 630 into the analog preview 615 (illustrated by arrow 637). Similar actions may be performed to add other windows as selected windows for a new workplace schema. Alternatively, where all of the application windows are to be selected, a gesture, button, or other selection mechanism may be available to add all currently available application windows into the new workplace schema. In doing so, the list 610 can be populated with information on and related to each of the application windows and the analog preview 615 of the workplace manager menu 605 can be populated with an illustration of each application window and corresponding application as positioned within the workplace schema.

Figure 7:
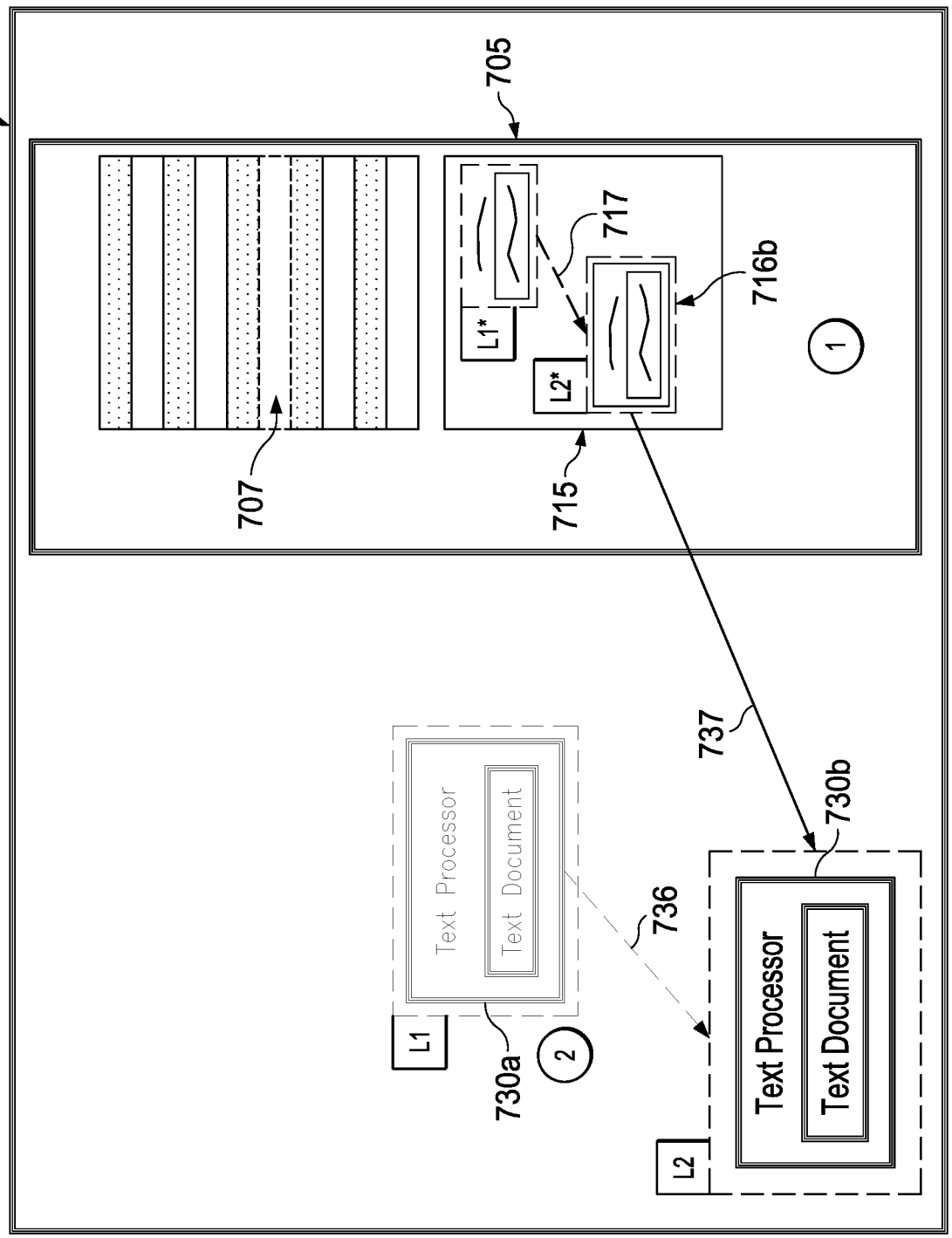
FIG. 7 illustrates an example illustration of modifications being performed with a workplace schema, namely a modified movement of a particular application window within an existing workplace schema.

FIG. 7 illustrates an example illustration of modifications being performed with a workplace schema, namely a modified movement of a particular application window within an existing workplace schema. In a work area 700, an existing workplace schema includes at least application window 730a associated with a text processor and text document. While illustrated as the only application/application window in the workplace schema, additional windows may be included in the workplace schema but hidden for purposes of illustration in FIG. 7. As illustrated, a user may modify the location (or alternatively, the size) of the application window 730a in two ways. First, the user may modify the location by dragging or otherwise moving the application window 716a shown in the analog preview from location L1* to location L2* (as illustrated by arrow 717), where the application window 716b is the result of the movement. Alternatively in a second option, changes in the location of application window 730a can be made within the work area 700 itself, with application window 730a illustrated as being moved from location L1 to location L2 (as illustrated by arrow 736), where the application window 730b is the result of the movement. In both instances, the movement of the application window in either of the locations (e.g., the work area 700 or the analog preview 715) can trigger a corresponding move within the other location such that the move is reflected appropriately (as illustrated by arrow 737, which can also point from application window 730b to 716b where the movement is made in the work area 700). Corresponding information associated with the new location can be updated in the list of the workplace manager 705 at 707. When reloading the workplace schema, application window 730b will be placed in the updated location L2 with corresponding changes made in the analog preview 715.

Figure 8:
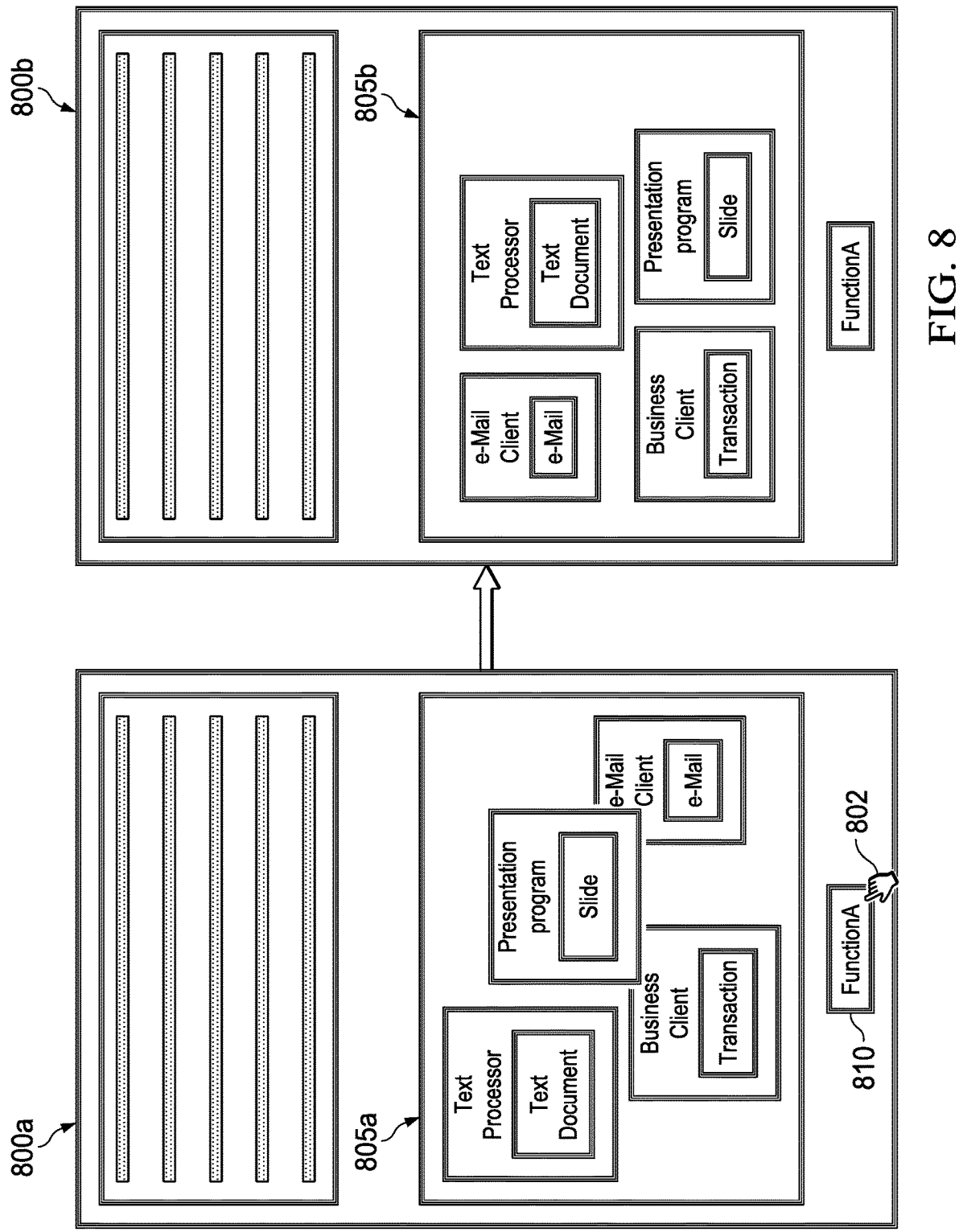
FIG. 8 illustrates an example illustration of modification of an existing workplace schema based on activation of a predefined rearrangement function.

FIG. 8 illustrates an example illustration of modification of an existing workplace schema based on activation of a predefined rearrangement function. In the illustrated example, at least one function "Function A" 810 is made available in the workplace manager 800a. As described, one or more rearrangement functions may be available to modify a work area layout associated with particular workplace schemas. Given a particular arrangement of application windows associated with applications executing in the work area 805a (shown in the corresponding analog preview of the work area), users can apply a particular function to perform specific arrangement and/or resizing functionality. In the illustrated example, Function A 810 is associated with a rearrangement function for removing overlapping windows and arranging the application windows into a historical order in which they were previously used from left to right. Alternative arrangement schemes can be used, including presenting the application windows in alphabetical order or in decreasing usage frequency. When Function A 810 is activated (as shown by 802), the work area 805b (as shown in the updated analog preview) is updated with the modified arrangement corresponding to the function results.

Figure 9A:
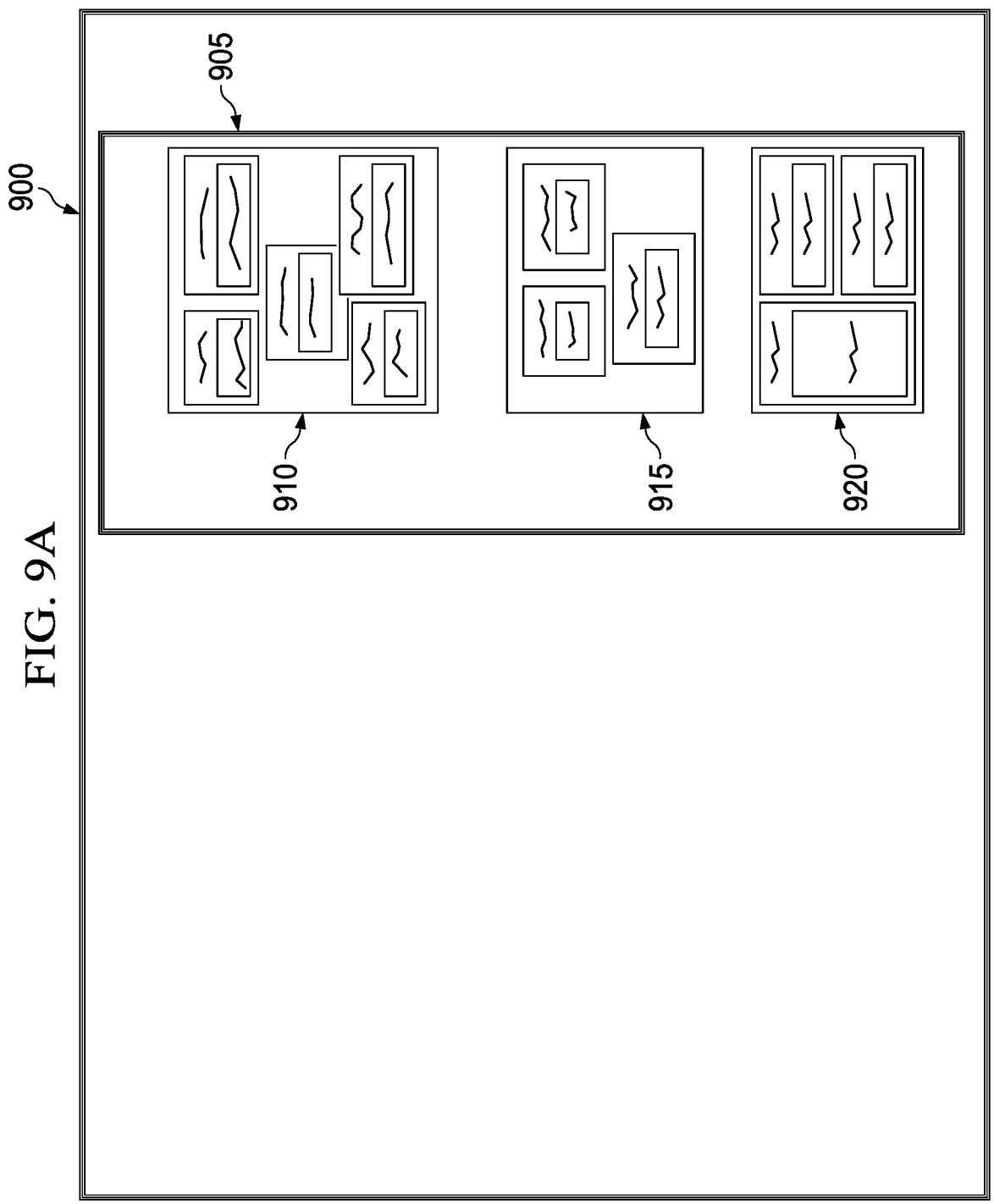
FIGS. 9A and 9B provide an example illustration of a selection of a particular workplace schema for loading or restoring from among a plurality of available workplace schemas.
Figure 9B:
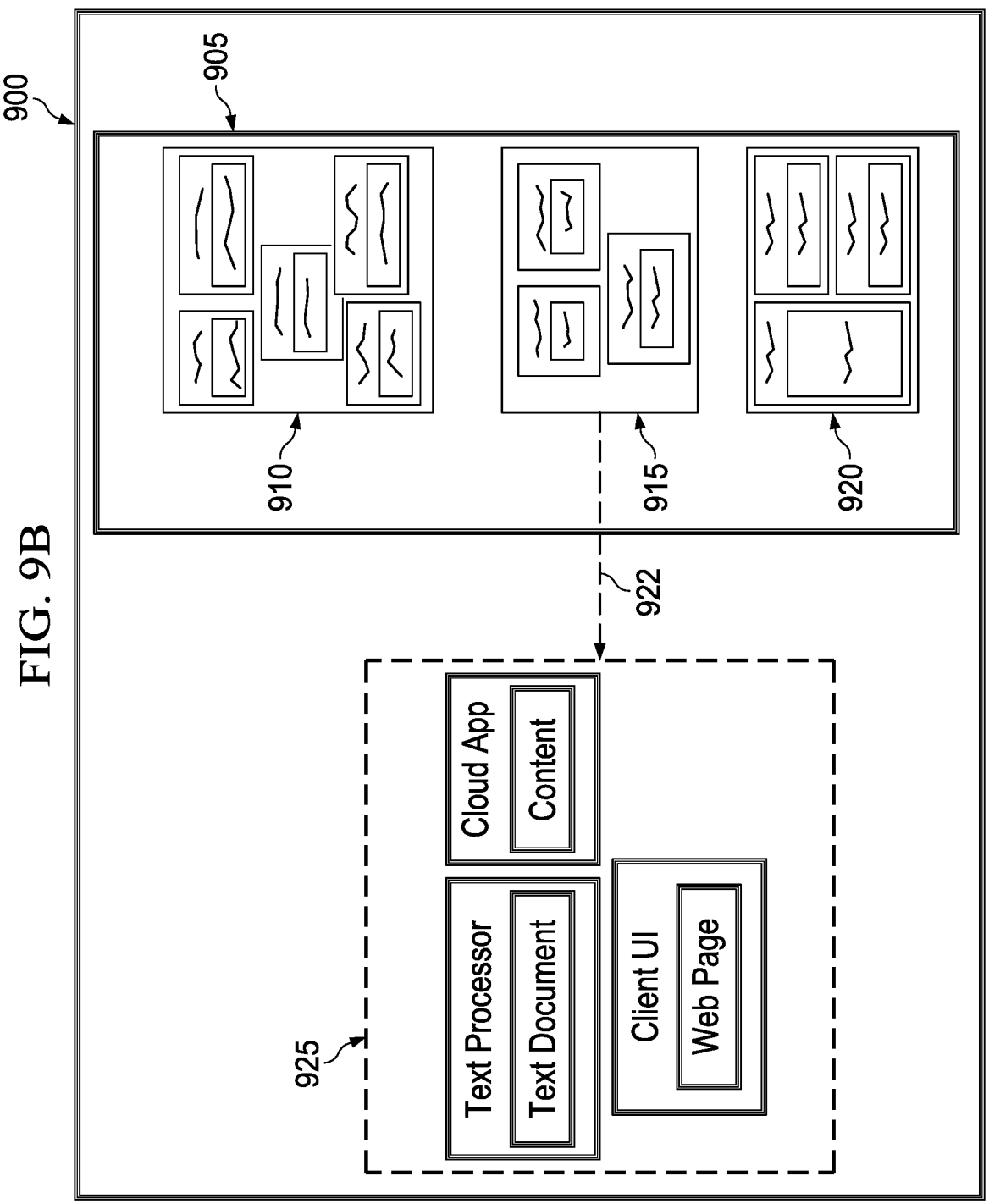

FIGS. 9A and 9B provide an example illustration of a selection of a particular workplace schema for loading or restoring from among a plurality of available workplace schemas. In FIG. 9A, an empty work area 900 is provided, while the workplace manager 905 provides three potential workplace schemas for loading as analog previews, including schema 910, 915, and 920. The previews allow users to review and identify particular applications or combinations of applications that may be used or needed, including the corresponding layout of those applications. In some instances, a title, context, or annotation associated with one or more of the previews may be available to assist the user in selecting a particular workplace schema for use in the tasks to be performed. In FIG. 9B, workplace schema 915 is selected by the user (as illustrated by arrow 922) and loaded into the work area 900 (as shown by 925) along with the instantiations of the applications and application windows included in the selected workplace schema 915. The selection may be a drag-and-drop on to the work area 900, a double-click or other gesture, as well as any other indication of selection.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method for managing workplace schemas performed by one or more processors, the method comprising:
   identifying a work area of a first user, the work area including a presentation of a plurality of windows, each window associated with an application;
   receiving a selection of at least one of the plurality of windows in the work area;
   in response to receiving a first request to associate the selected windows with a workplace schema:
      determining locations of the selected windows in the work area;
      identifying a content item associated with a particular one of the selected windows; and
      storing the determined locations of the selected windows and the identified content item associated with the particular one of the selected windows in a first workplace schema as a first state of the work area, the first workplace schema storing a layout of the work area based on the determined locations of the selected windows, wherein the identified content item associated with the particular one of the selected windows is stored without an association to a particular application;
   receiving a second request from a second user different than the first user for the first workplace schema in the first state of the work area; and
   in response to receiving the second request:
      identifying the applications associated with the selected windows stored in the first workplace schema and the content item associated with the particular one of the selected windows as stored in the first state of the work area;
      instantiating the identified applications in a work area of the second user;
      identifying a particular application available to the second user capable of loading the identified content item, wherein the particular application is different than the application associated with the window of the identified content item of the first user;
      instantiating the identified particular application in the work area of the second user, the instantiated particular application associated with the location of the particular one of the selected windows associated with the content item, wherein the instantiated particular application loads the identified content item; and
      arranging windows associated with the instantiated applications in the work area of the second user based on the stored determined locations of the selected windows in the first workplace schema.

2. The method of claim 1, wherein the determined locations of each of the selected windows correspond to an absolute location within the work area of the selected windows.

3. The method of claim 1, wherein the determined locations of each of the selected windows correspond to relative location between a particular selected window and at least one other selected window.

4. The method of claim 1, further comprising:
   receiving at least one annotation associated with the selected windows; and
   storing the at least one annotation as a description of the first workplace schema, wherein the at least one annotation represents a searchable attribute of the first workplace schema.

5. The method of claim 1, further comprising:
   identifying, after a first storing of the first workplace schema, a modification to the location of at least one of the windows associated with the first workplace schema in the work area; and
   updating the location associated with the at least one modified window in the stored first workplace schema.

6. The method of claim 1, further comprising:
   receiving, after a first storing of the first workplace schema, an additional selection of at least one additional window in the work area;
   in response to receiving a request to associate the additionally selected windows with the first workplace schema, determining locations of the additionally selected windows in the work area; and
   storing the determined locations of the additionally selected windows in the first workplace schema, the first workplace schema storing the layout of the work area based on the determined locations of the previously selected windows and the additionally selected windows.

7. A non-transitory, computer-readable medium storing computer-readable instructions executable by a computer and configured to:
   identify a work area of a first user, the work area including a presentation of a plurality of windows, each window associated with an application;
   receive a selection of at least one of the plurality of windows in the work area;
   in response to receiving a first request to associate the selected windows with a workplace schema:
      determine locations of the selected windows in the work area;
      identify a content item associated with a particular one of the selected windows; and store the determined locations of the selected windows and the identified content item associated with the particular one of the selected windows in a first workplace schema as a first state of the work area, the first workplace schema storing a layout of the work area based on the determined locations of the selected windows, wherein the identified content item associated with the particular one of the selected windows is stored without an association to a particular application;

receive a second request from a second user different than the first user for the first workplace schema in the first state of the work area; and in response to receiving the second request:
  identify the applications associated with the selected windows stored in the first workplace schema and the content item associated with the particular one of the selected windows as stored in the first state of the work area;
  instantiate the identified applications in a work area of the second user;
  identify a particular application available to the second user capable of loading the identified content item, wherein the particular application is different than the application associated with the window of the identified content item of the first user;
  instantiate the identified particular application in the work area of the second user, the instantiated particular application associated with the location of the particular one of the selected windows associated with the content item, wherein the instantiated particular application loads the identified content item; and
  arrange windows associated with the instantiated applications in the work area of the second user based on the stored determined locations of the selected windows in the first workplace schema.

8. The non-transitory, computer-readable medium of claim 7, wherein the identified state information for at least one of the selected windows corresponds to a particular location in a document currently viewed in the application associated with the at least one selected window.

9. The non-transitory, computer-readable medium of claim 7, wherein the determined locations of each of the selected windows correspond to an absolute location within the work area of the selected windows.

10. The non-transitory, computer-readable medium of claim 7, wherein the determined locations of each of the selected windows correspond to relative location between a particular selected window and at least one other selected window.

11. The non-transitory, computer-readable medium of claim 7, the instructions further configured to:
  receive at least one annotation associated with the selected windows; and
  store the at least one annotation as a description of the first workplace schema, wherein the at least one annotation represents a searchable attribute of the first workplace schema.

12. The non-transitory, computer-readable medium of claim 7, the instructions further configured to:
  identify, after a first storing of the first workplace schema, a modification to the location of at least one of the windows associated with the first workplace schema in the work area; and
  updating the location associated with the at least one modified window in the stored first workplace schema.

13. The non-transitory, computer-readable medium of claim 7, the instructions further configured to:
  receive, after a first storing of the first workplace schema, an additional selection of at least one additional window in the work area;
  in response to receiving a request to associate the additionally selected windows with the first workplace schema, determine locations of the additionally selected windows in the work area; and
  store the determined locations of the additionally selected windows in the first workplace schema, the first workplace schema storing the layout of the work area based on the determined locations of the previously selected windows and the additionally selected windows.

14. A system, comprising:
a memory;
at least one hardware processor interoperably coupled with the memory and configured to:
  identify a work area of a first user, the work area including a presentation of a plurality of windows, each window associated with an application;
  receive a selection of at least one of the plurality of windows in the work area;
  in response to receiving a first request to associate the selected windows with a workplace schema:
    determine locations of the selected windows in the work area;
    identify a content item associated with a particular one of the selected windows; and
    store the determined locations of the selected windows and the identified content item associated with the particular one of the selected windows in a first workplace schema as a first state of the work area, the first workplace schema storing a layout of the work area based on the determined locations of the selected windows, wherein the identified content item associated with the particular one of the selected windows is stored without an association to a particular application;
  receive a second request from a second user different than the first user for the first workplace schema in the first state of the work area; and
  in response to receiving the second request:
    identify the applications associated with the selected windows stored in the first workplace schema and the content item associated with the particular one of the selected windows as stored in the first state of the work area;
    instantiate the identified applications in a work area of the second user;
    identify a particular application available to the second user capable of loading the identified content item, wherein the particular application is different than the application associated with the window of the identified content item of the first user;
    instantiate the identified particular application in the work area of the second user, the instantiated particular application associated with the location of the particular one of the selected windows associated with the content item, wherein the instantiated particular application loads the identified content item; and
    arrange windows associated with the instantiated applications in the work area of the second user based on the stored determined locations of the selected windows in the first workplace schema.

15. The system of claim 14, wherein the determined locations of each of the selected windows correspond to an absolute location within the work area of the selected windows.

16. The system of claim 14, wherein the determined locations of each of the selected windows correspond to relative location between a particular selected window and at least one other selected window.

17. The system of claim 14, the at least one hardware processor further configured to:
receive at least one annotation associated with the selected windows; and
store the at least one annotation as a description of the first workplace schema, wherein the at least one annotation represents a searchable attribute of the first workplace schema.

18. The system of claim 14, the at least one hardware processor further configured to:
identify, after a first storing of the first workplace schema, a modification to the location of at least one of the windows associated with the first workplace schema in the work area; and
update the location associated with the at least one modified window in the stored first workplace schema.

19. The system of claim 14, the at least one hardware processor further configured to:
receive, after a first storing of the first workplace schema, an additional selection of at least one additional window in the work area;
in response to receiving a request to associate the additionally selected windows with the first workplace schema, determine locations of the additionally selected windows in the work area; and
store the determined locations of the additionally selected windows in the first workplace schema, the first workplace schema storing the layout of the work area based on the determined locations of the previously selected windows and the additionally selected windows.

* * * * *